Patented Sept. 16, 1941

2,256,149

UNITED STATES PATENT OFFICE 2,256,149

PREPARATION OF METHYL VINYL KETONE

John R. Long, Akron, Ohio, assignor to Wingfoot Corporation, Wilmington, Del., a corporation of Delaware No Drawing. Application June 4, 1940,
Serial No. 338,743

5 Claims. (Cl. 260—595)

This invention relates to an improved method of preparing methyl vinyl ketone and, more particularly, to the treatment of 3-chlor-2-butanone to produce such methyl vinyl ketone.

Attempts to prepare methyl vinyl ketone by removing hydrogen chloride from 3-chlor-butanone by pyrolysis in the presence of catalysts have been unsuccessful. It has now been found that if the 3-chlor-2-butanone be first converted to 3-acetoxy-2-butanone, the latter compound can readily be pyrolyzed to yield the desired substance.

The conversion of the 3-chlor-2-butanone to the acetoxy compound can be brought about, for example, by treatment with an alkali metal acetate in acetic acid, sodium acetate in acetic acid being found effective. The reaction proceeds in accordance with the following equation:

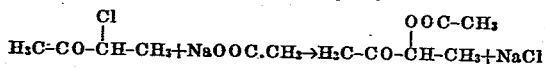

The 3-acetoxy-2-butanone is then subjected to pyrolysis at temperatures which may range from 400–700° C. but preferably from 500–550° C., with best results obtained in the vicinity of 525° C. A catalyst may be present, such as copper. The product of pyrolysis is then fractionated, preferably under less than atmospheric pressure, say that corresponding to 50–60 mm. mercury, to recover the methyl vinyl ketone. The reaction involved is the following:

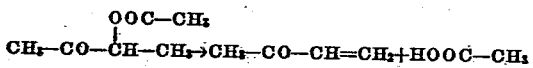

To illustrate the invention, the following example is given, although it will be understood that the invention is not limited to the conditions therein set forth.

A mixture of 3 mols sodium acetate, 6 mols acetic acid and 3 mols 3-chlor-2-butanone was refluxed for a day. The salt which formed was filtered off and the product was isolated by fractional distillation of the filtrate. The 3-acetoxy-2-butanone thus prepared was then passed through a 28 mm. Pyrex tube packed with copper turnings, the tube being heated in a 30" furnace to a temperature of 520–525 C. One hundred twelve grams of the acetylated compound were passed through the tube in an hour. The crude product was then fractionated at atmospheric pressure to give a yield of 20.2 grams of methyl vinyl ketone. More of the ketone can be recovered if the distillation is carried on at reduced pressure, a pressure corresponding to 50–60 mm. of Hg being suitable.

The conditions given above can be varied, of course, various contact catalysts being available besides those mentioned and the speed of passage through the heated tube and the temperature being adjustable to give the best results. Also, the method of preparing the 3-acetoxy-2-butanone from the 3-chlor butanone may be varied, as by employing other acetylating agents, such as potassium acetate in acetic acid or in alcohol. Other acetates in other non-aqueous solvents therefor may also be employed.

While there has been described above a certain preferred embodiment of the invention, it will be apparent that various changes and modifications may be made therein without departing from the spirit of the invention. Accordingly, the invention is to be limited only by the appended claims in which it is intended to set forth all features of patentable novelty residing therein.

What I claim is:

1. A method of preparing methyl vinyl ketone which comprises acetylating 3-chlor-2-butanone and pyrolyzing the resulting product to obtain the methyl vinyl ketone.

2. A method of preparing methyl vinyl ketone which comprises acetylating 3-chlor-2-butanone and then heating the acetate at a temperature between about 400 and 700° C. to obtain the methyl vinyl ketone.

3. The method which comprises treating 3-chlor-2-butanone with an alkali metal acetate in acetic acid, heating the acetate so formed to a temperature between about 400 and 700° C. and distilling the product to obtain methyl vinyl ketone.

4. The method which comprises treating 3-chlor-2-butanone with sodium acetate in acetic acid to form 3-acetoxy-2-butanone, heating the acetate to a temperature between about 500° and 550° C. to split off acetic acid and recovering methyl vinyl ketone from the product.

5. The method which comprises treating 3-chlor-2-butanone with potassium acetate in acetic acid to form 3-acetoxy-2-butanone, heating the acetate to a temperature between about 500° and 550° C. to split off acetic acid and recovering methyl vinyl ketone from the product.

JOHN R. LONG.